J. C. HITCHCOCK.
COMBINED BAIT-KETTLE AND COOLER.
No. 181,844. Patented Sept. 5, 1876.
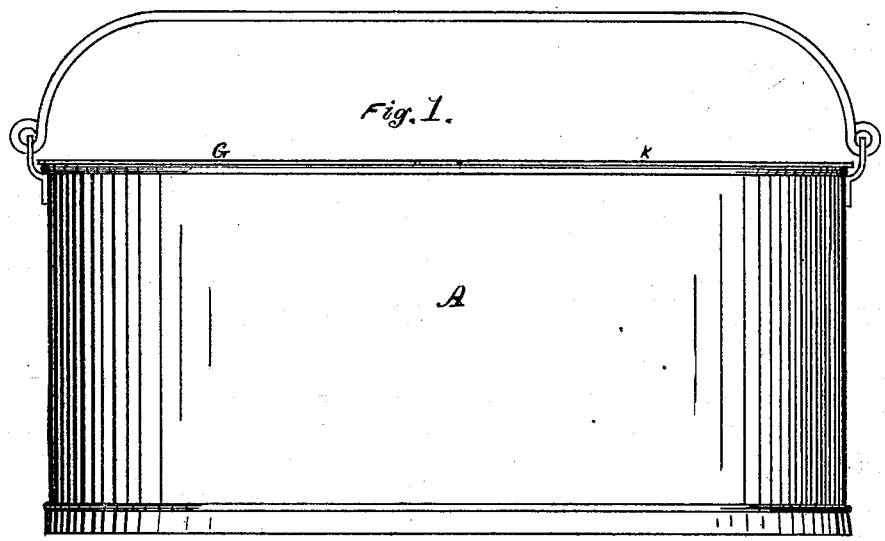
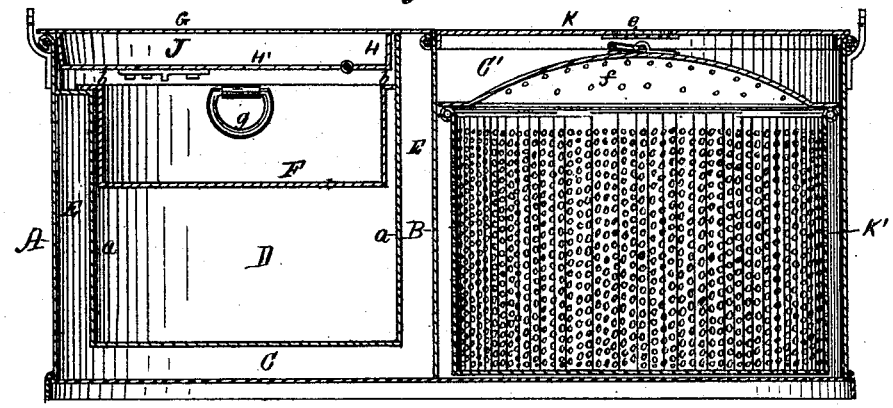
Witnesses.
A. H. Sherburne,
N. Cowles
Inventor:
James C. Hitchcock
By Gridley & Sherburne
Attys

UNITED STATES PATENT OFFICE.

JAMES C. HITCHCOCK, OF OCONOMOWOC, WISCONSIN.

IMPROVEMENT IN COMBINED BAIT-KETTLE AND COOLER.

Specification forming part of Letters Patent No. 181,844, dated September 5, 1876; application filed June 13, 1876.

*To all whom it may concern:*

Be it known that I, JAMES C. HITCHCOCK, of Oconomowoc, in the county of Waukesha and State of Wisconsin, have invented a new, useful, and Improved Combined Ice-Cooler and Minnow-Bucket; and I do hereby declare the following to be a full, clear, and exact description thereof, which will enable others to make and use the same, reference being had to the accompanying drawing, forming part of this specification, in which—

Figure 1 represents a side elevation of a combined ice-cooler and minnow-bucket embodying my invention, and Fig. 2 represents a vertical longitudinal central section of the same.

Like letters of reference indicate like parts.

My invention relates to a combined ice-cooler and minnow-bucket, provided with compartments or trays, more particularly adapted for the use of fishermen; and consists in the construction and arrangement of the several parts thereof, as hereinafter described.

In the drawing, A represents the outer or main case of the bucket and cooler, which may be made of any suitable material, preferably of tin. B is a transverse partition, located near the center of the case, and extends upward to, or nearly to, the top of the case, and so as to divide it into two compartments, C C'. The compartment C is provided with an inner wall, $a$, attached to the inner surface of said compartment, so as to form an air-chamber, E, between said inner wall and the walls of said compartment, and so as to form a water-tight compartment, D, for the reception of ice. F is a removable tray or lunch-box, provided on its upper end with an outwardly-projecting flange, $b$, so as to rest upon the upper surface of the wall of the compartment or ice-chamber D, when said tray is placed therein, and so as to hold said tray in a suspended position within said chamber D.

G is the cover to the compartment C, and is so hinged to the partition B as to admit of being opened and closed. H is a depending rim, permanently attached to the lower surface of the cover G, and is provided with a hinged bottom, H', so arranged, in connection with said rim, as to form a compartment, J, within which fishing-tackle may be carried.

K is a removable cover to the compartment C', so adjusted as to be removed from said compartment when desired, and is provided with a series of perforations, $e$, for admitting air into said compartment C'.

K' is a supplemental minnow-bucket, which may be made of perforated tin or wire-cloth, and is provided with a perforated tin cover, $f$, and is so constructed as to be readily inserted and removed from the compartment C'. The tray F is provided on each side with a handle, $g$, for removing the same from the compartment D.

When using my said ice-cooler and minnow-bucket, the compartment D is filled with ice, and the compartment C', which is made water-tight, is partly filled with water, in which the bait or minnows are placed.

The ice in the compartment D not only keeps the water in the compartment C' cool, and keeps the minnows alive and lively, but tends to keep fresh and cool the lunch and other usual accompaniments contained in the tray F or compartment D.

I prefer to use, in connection with compartment C', the supplemental perforated minnow-bucket K', within which the minnows are placed, as, on withdrawing said bucket from the compartment C', the water flows out of, and through the perforations in, the bucket into said compartment, and so as to leave the minnows on the bottom of the bucket, and readily caught for use as bait, when the bucket is replaced within said water-compartment, and again fills with water.

It is obvious that my said device, upon removing the bucket K', may be used as a combined ice-cooler and lunch-basket.

Having thus described my invention, what I claim as new, and desire to secure by Letters Patent, is—

1. The combination, with the compartment

C', provided with the perforated cover K, of the compartment C, provided with the inner wall $a$, substantially as specified.

2. The combination, with the compartment C, provided with the inner wall $a$ and compartment C', of the perforated and removable bucket K', substantially as specified.

3. The combination, with the compartment C, of the cover G, provided with the rim H and hinged bottom H', forming the compartment J, substantially as and for the purpose specified.

JAMES C. HITCHCOCK.

Witnesses:
N. C. GRIDLEY,
N. H. SHERBURNE.